C. TONIOLO.
OXIDATION OF AMMONIA.
APPLICATION FILED DEC. 23, 1918.
1,318,936.
Patented Oct. 14, 1919.
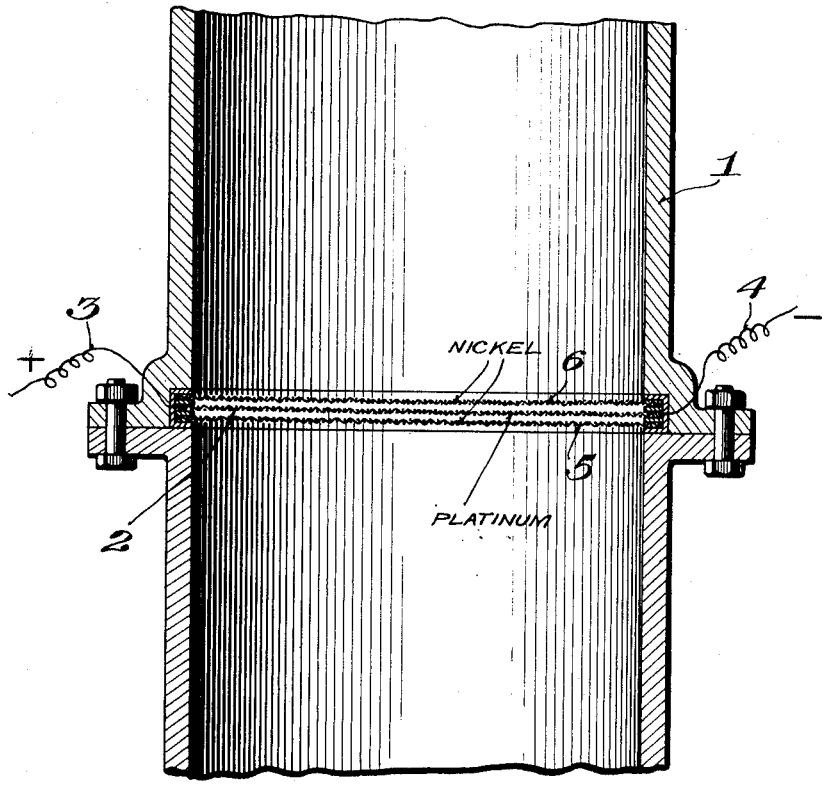
Witness
Chas. L. Gieshauer
Inventor
Carlo Toniolo,
By W. P. McElroy
Attorney

UNITED STATES PATENT OFFICE.

CARLO TONIOLO, OF MILAN, ITALY.

OXIDATION OF AMMONIA.

1,318,936. Specification of Letters Patent. Patented Oct. 14, 1919.

Application filed December 23, 1918. Serial No. 267,925.

*To all whom it may concern:*

Be it known that I, CARLO TONIOLO, a subject of the King of Italy, residing at Milan, Lombardy, Italy, have invented certain new and useful Improvements in Oxidation of Ammonia, of which the following is a specification.

This invention relates to oxidation of ammonia; and it comprises a method of oxidizing ammonia by the use of the oxygen of air wherein a mixture of air and ammonia is passed through a thin catalytically acting screen situated between a pair of metal screens acting to intercept and return heat radiating from the first-named screen, said pair of screens being made of any suitable metal but most advantageously being of nickel; and it also comprises as a new organization of apparatus elements for the oxidation of ammonia by air, a conduit, a catalytic screen spanning said conduit, said screen being advantageously composed of platinum netting or gauze and being as thin as may be, means for supplying heat when desired, means for supplying air and ammonia to one end of said conduit, means for removing nitrose gases at the other end of said conduit and a heat-intercepting screen, serving also as a gas purifier and gas preheater, located in close proximity to said catalytic screen and between the same and the point of inlet of air and ammonia, and usually, another heat-intercepting screen located on the other side of the catalytic screen, that is, between it and the point of exit of nitrose gases; all as more fully hereinafter set forth and as claimed.

Oxidation of ammonia in gaseous form by air, or oxygen, is a well understood reaction, utilized on the large scale in making nitric acid, ammonium nitrate, etc., but it is difficult to so conduct it in practice as to obtain large yields of oxidized nitrogen products from the ammonia with simple and economically operating apparatus. In the oxidation a catalyst is always used to accelerate the action. While very many and various catalysts, including salts of easily reducible and oxidizable metal acids, such as vanadic acid and chromic acid, reducible metal oxids, such as lead oxids, bismuth oxid, copper oxid, etc., have been proposed, in practice the catalyzer is usually metallic platinum.

Oxidation of ammonia by the oxygen of air is an exothermic action. Using platinum as a catalyzer, the reaction begins to take place with a noticeable velocity only at a rather high temperature. Between 400° and 500° C., the reaction speed is rather great and at 650° C. it becomes extremely rapid, being almost instantaneous. The particular temperatures however at which reaction velocity attains any great magnitude varies with different catalyzers. The net result of the oxidation also varies with the catalyzer and with the circumstances. In burning $NH_3$ with O, the net result may be a simple removal of hydrogen and liberation of nitrogen in the free state, or the action may go on further with the production of oxids of nitrogen. The latter is of course the result desired. Nitrogen oxids, once more, may in turn be catalyzed back to nitrogen and oxygen by the catalyst itself.

A simple calculation shows that the heat of oxidation of ammonia should be more than enough to maintain not only the desired temperature of, say, 650° to 700° C., but even greater temperatures; but in practice, using air, it is found difficult to maintain the desired temperature without the use of heat from outside sources to balance heat losses by conduction, radiation, etc.

Platinum used as a catalyst is ordinarily in the form of a wire gauze or netting diaphragm or septum spanning a conduit through which passes the mixture of air and ammonia. The ideal structure of diaphragm, both for the sake of economy in expensive metal and for technical reasons, is a close-meshed, thin fabric made of fine wire. The finer the wire and the closer the mesh, the more thorough is the contact of the gas mixture with the catalyst and the shorter is the period of its exposure thereto—the latter being desirable since the nitrogen oxids should be removed from the catalytic activity of the platinum as soon as they are formed. But the thinner the gauze septum, the greater is the ratio of the heat-radiating surface to the mass and the greater are the heat losses.

In the art many methods have been proposed for obviating these heat losses. In one method, the hot gases coming from the catalyzer, or the so-called "nitrose gases," are caused to flow in counter-current with the cold gases going to the catalyzer through suitable heat exchangers, thereby giving up the heat of the nitrose gases to the fresh gases. Sometimes the fresh gases are preheated in other manners, as by passing through furnace heated tubes. An expedient frequently proposed is to pass a heating current of electricity through the catalyzer itself.

All these methods have important practical objections. In the use of preheaters or other heat exchangers or direct heating devices, it is in practice necessary to give a relatively long period of exposure of the gas mixture to the hot metal and most of the metals here in contemplation have an injurious catalytic effect on the ammonia. Nickel probably has less than most other metals and for that reason heat exchangers and heaters are ordinarily made of nickel tubing, which is expensive. Repairs, which are frequently necessary, especially at welded or jointed parts, are difficult and costly. Aluminum, which has no particular catalytic action, has too low a melting point to make it practical for these purposes. All these devices further mean greater complication and greater expense.

Heat of reaction may be kept up and comparatively simple apparatus used by artificially enriching the air with oxygen; but this is expensive and necessitates a complicated installation for the production of oxygen.

It is the object of the present invention to carry out the oxidation of ammonia by air in a simple and direct manner, utilizing the heat of the reaction for maintaining said reaction without the use of complicated preheaters or heat exchangers; and to obtain certain other advantages.

Conceiving a simple catalytic screen of fine platinum gauze spanning a conduit and at a temperature of, say, 675° C., supplied with a cold mixture of air and ammonia, it is obvious that the catalyst must bring the gases to the reaction temperature. In other words, the face of entry of the gases is at less than the reacting temperature, being kept so by the cold gas mixture. This part of the platinum is not catalytically active, since it is acting merely as a preheater. Very little preheating is given to the gases by radiation from the catalyst, since the gas mixture is passing at high speed and has, like any other gas mixture, but a feeble power of absorption for radiated heat.

In the present invention, I simply mount another screen of nickel wire gauze immediately adjacent to the platinum or catalytic screen and between it and the point of entry of the cold gases. This auxiliary screen is best made of nickel, since nickel has, as stated, little catalytic action on ammonia. This auxiliary screen receives the heat radiated by the catalytic screen and is itself brought to a high temperature, and it then acts as a preheater for the gas mixture. In other words, in lieu of using part of the platinum as a catalyst and part as a preheater, I transfer the preheating duty to a screen or netting of nickel. This gives me a much higher utilization of the catalytic power of my platinum and therefore a marked economy. This auxiliary screen in advance of the catalytic screen also has a number of other utilities.

Ammonia gas is invariably more or less impure. Where it is derived from gas works ammonia, it usually contains various hydrocarbons, sulfur, etc., and where it is made from cyanamid, it usually contains more or less acetylene and phosphin or phosphoreted hydrogen. On contact with the hot platinum, these impurities decompose or react and tend to "poison" the catalyst. With the use of the hot nickel netting in advance of the platinum the nickel, which is highly catalytic as regards hydrocarbons, etc., breaks up these bodies and causes harmless oxidation, obviating injury to the catalyst. Again, no matter how carefully filtered the air used in the operation may be, in view of the relatively enormous volumes used, it is difficult to prevent presence of more or less dust. In the ordinary method of oxidizing, this dust, which is of varied character but is largely mineral, is deposited on the platinum and gradually coats or enamels it, restricting the active area. With the present device, this dust is caught on the nickel without reaching the platinum.

With a fine-meshed nickel screen mounted in the path of the gases going to the platinum and in heat receiving proximity to the platinum, it is not difficult to keep the temperature of the platinum at the proper point by the action of the platinum itself. It is, however, advantageous to mount another and similar nickel screen in heat receiving proximity to the platinum or catalyst screen on the other side; that is, beyond the platinum screen. A platinum netting so mounted between heat intercepting metallic screens on each side is easily kept at the desired temperature by the oxidation, even where, as is sometimes desirable, the amount of air relative to ammonia is rather great.

The platinum netting and the two other nettings by which it is inclosed offer but little resistance to the forward passage of the gases and a small apparatus may be given a relative great capacity and particularly since in the present apparatus all the platinum is catalytically active. The essence of the present invention is intercepting and returning the radiated heat coming from the catalyst by means of pervious diaphragms on one or both sides. Other catalytic metals than platinum may of course be used in the same way; but I regard platinum or alloys containing platinum as being the best for the present purposes. Other metals than nickel may be used for the auxiliary or intercepting screens, but I regard nickel as best.

The auxiliary screens may be in direct contact with the platinum screen, receiving heat by conduction as well as radiation, but I ordinarily regard it as better to separate them by a small space.

In the accompanying illustration I have shown, more or less diagrammatically, apparatus within the present invention and susceptible of use in the performance of the described process. In this showing, which is in vertical central section, element 1 is a tube or conduit of any suitable material. At one point it is spanned by a pervious septum or diaphragm 2 of fine-meshed platinum gauze. Heat for starting may be imparted by a heating current sent through the diaphragm from current leads 3 and 4. Other methods of securing heat for starting may be used; but electric heat is simple and convenient. Instead of using platinum gauze, perforated platinum foil may be used; but the gauze is best. Other catalysts, if used, may be employed as a pervious screen. Whatever the catalytic screen, in operation the heat developed by the oxidation is rapidly lost, partly as sensible heat of the escaping nitrose gases and partly by radiation. As previously set forth, the thinner the catalyst diaphragm the better are the conditions, chemically considered; but the greater is the loss of heat by radiation; and the heat so radiated cannot well be intercepted by a solid wall, since so to do would interfere with the simplicity of apparatus and with the desirable right-line movement of gases. Therefore I mount in the tube in close proximity to the catalyst diaphragm, a preheating diaphragm 5 of fine gauze, made of nickel or other metal exercising but little catalytic influence on the ammonia. The preheating diaphragm intercepts and returns heat radiating from the catalyst, itself being raised to a high temperature and imparting this heat to the ammonia and air immediately prior to their contact with the catalyst; the time during which they are together at high temperature being thereby reduced to a minimum. There may be one or more of these preheating diaphragms; but one is generally sufficient. In addition to its heat intercepting and returning function, it has the further function of acting to intercept hydrocarbon vapors and gases and "catalyst poisons", as well as dust. It is better, where a plurality of diaphragms is used to mount another, 6, on the other side of the catalyst diaphragm. This second auxiliary diaphragm operates, not only as a radiation shield, intercepting the radiation from the catalyst diaphragm but also by receiving heat from the hot gases and aiding in keeping said catalyst hot. Like the first auxiliary diaphragm, it is advantageously made of fine-meshed nickel gauze.

With the described structure, a minimum of platinum suffices for an apparatus of large capacity and the catalyst proves of very long life, even with relatively impure ammonia. Once it is brought to the proper red heat, the reaction takes care of itself, the catalyst, however thin it may be, preserving the desired temperature. The action is of course exactly the same whether catalyst diaphragm 2 be made of platinum gauze or another catalytic material.

What I claim is:—

1. In the oxidation of ammonia by air in the presence of a pervious catalytic diaphragm, the process which comprises preliminarily passing the mixture of air and ammonia through a heated metal gauze in heat intercepting proximity to said catalytic diaphragm, said gauze being made of a metal substantially non-catalytic with regard to ammonia.

2. In the oxidation of ammonia by air in the presence of a pervious catalytic diaphragm, the process which comprises preliminarily passing the mixture of air and ammonia through a heated metal gauze in heat intercepting proximity to said catalytic diaphragm, said gauze being of nickel.

3. In the oxidation of ammonia by air, the process which comprises passing a mixture of air and ammonia through a hot platinum wire gauze mounted between and in close proximity to two pervious heat intercepting metal members made of metal substantially non-catalytic as regards ammonia.

4. In the oxidation of ammonia by air, the process which comprises passing a mixture of air and ammonia through a hot platinum wire gauze mounted between and in close proximity to two pervious heat intercepting nickel diaphragms.

5. In ammonia oxidizing apparatus, a conduit, a pervious catalytic diaphragm spanning said conduit and a thin wire gauze of non-catalytic metal also spanning said conduit and mounted in heat receiving and returning proximity to said catalytic diaphragm.

6. In ammonia oxidizing apparatus, a conduit, a pervious catalytic diaphragm spanning said conduit and a thin nickel gauze also spanning said conduit and mounted in heat receiving and returning proximity to said catalytic diaphragm.

7. In ammonia oxidizing apparatus, a conduit, a thin, fine-meshed platinum gauze diaphragm spanning said conduit and a thin, fine-meshed nickel gauze diaphragm also spanning said conduit and mounted in heat receiving and returning proximity to said platinum gauze.

8. In ammonia oxidizing apparatus, a conduit, a thin, fine-meshed platinum wire gauze diaphragm spanning said conduit and a pair of fine-meshed nickel gauze diaphragms, one being on each side of said platinum wire gauze and mounted in heat receiving and returning proximity thereto.

In testimony whereof I affix my signature hereto.

CARLO TONIOLO.